United States Patent [19]
Bastian et al.

[11] 3,875,233
[45] Apr. 1, 1975

[54] BIS-P-HYDROXY-PHENETHYL AMINES

[75] Inventors: Jean-Michel Bastian, Therwil; Klaus Hasspacher, Riehen, both of Switzerland

[73] Assignee: Sandoz Ltd., Basel, Switzerland

[22] Filed: Jan. 22, 1973

[21] Appl. No.: 325,877

[30] Foreign Application Priority Data

| Jan. 25, 1972 | Switzerland | 1071/72 |
|---|---|---|
| Feb. 4, 1972 | Switzerland | 1698/72 |
| Feb. 4, 1972 | Switzerland | 1700/72 |
| Feb. 17, 1972 | Switzerland | 2294/72 |
| Feb. 17, 1972 | Switzerland | 2295/72 |
| Apr. 24, 1972 | Switzerland | 6034/72 |
| May 23, 1972 | Switzerland | 7594/72 |

[52] U.S. Cl....... 260/570.7, 260/471 A, 260/473 R, 260/544 R, 260/556 A, 260/570.5 P, 260/570.6, 260/570.8 R, 260/575, 424/321, 424/330

[51] Int. Cl............................................. C07c 87/28

[58] Field of Search...... 260/556 A, 570.5 P, 570.6, 260/570.7, 570.8 R

[56] References Cited
UNITED STATES PATENTS

| 3,329,709 | 7/1967 | Schmid et al. | 260/570.6 |
|---|---|---|---|
| 3,644,353 | 2/1972 | Lunts et al. | 260/570.6 |
| 3,689,524 | 9/1972 | Jack et al. | 260/570.8 R |

*Primary Examiner*—Henry R. Jiles
*Assistant Examiner*—S. D. Winters
*Attorney, Agent, or Firm*—Gerald D. Sharkin; Robert S. Honor; Thomas O. McGovern

[57] ABSTRACT

The invention concerns novel compounds of the formula:

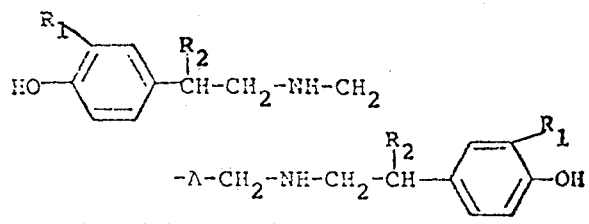

wherein $R_1$ is hydroxyl, hydroxymethyl or $$-NH-SO_2-R_3,$$

wherein $R_3$ is alkyl of 1 to 4 carbon atoms;
$R_2$ is hydroxymethyl when $R_1$ is hydroxyl; or hydroxyl when $R_1$ is other than hydroxyl; and
A is
i. when $R_1$ is hydroxyl,

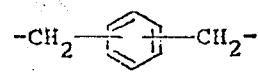

wherein the ring substituents are ortho or meta to each other; or

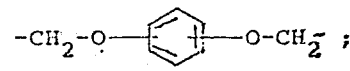

ii. when $R_1$ is hydroxymethyl,

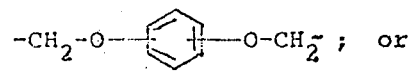 or iii. when $R_1$ is $-NH-SO_2-R_3$ wherein $R_3$ is as defined above;

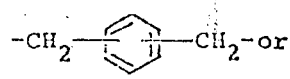

or

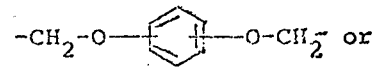 or iv. when $R_1$ is $-NH-SO_2-R_3$ wherein $R_3$ is as defined above,
$-(CH_2)_n-$ wherein $n$ is 0 or an integer from 1 to 8,
useful as bronchospasmolytic agents.

7 Claims, No Drawings

BIS-P-HYDROXY-PHENETHYL AMINES

The present invention relates to a p-hydroxyphenylethylamine derivatives.

In accordance with the invention there are provided new compounds of formula I,

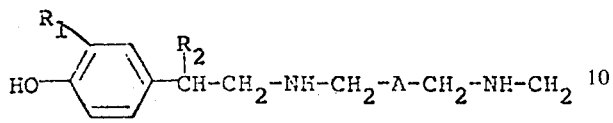

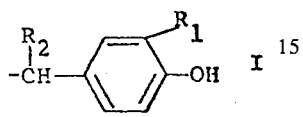 I wherein $R_1$ is hydroxyl, hydroxymethyl or $$-NH-SO_2-R_3,$$

wherein $R_3$ is alkyl of 1 to 4 carbon atoms; $R_2$ is hydroxymethyl when $R_1$ is hydroxyl; or hydroxyl when $R_1$ is other than hydroxyl; and A is i. when $R_1$ is hydroxyl,

wherein the ring substituents are ortho or meta to each other; or

ii. when $R_1$ is hydroxymethyl,

 or iii. when $R_1$ is $-NH-SO_2-R_3$ wherein $R_3$ is as defined above,

 or

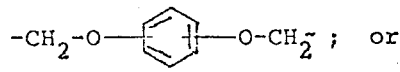 or iv. when $R_1$ is $-NH-SO_2-R_3$ wherein $R_3$ is as defined above,
$-(CH_2)_n-$ wherein $n$ is 0 or an integer from 1 to 8.

Further, in accordance with the invention a compound of formula I may be obtained by a process comprising
a. hydrogenating a compound of formula II,

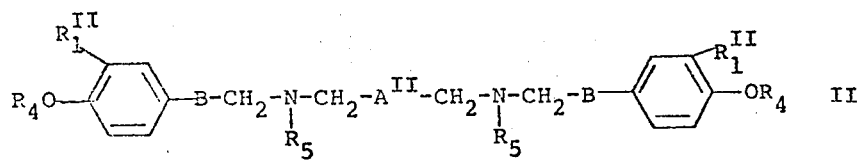 II wherein $R_4$ is hydrogen or benzyl,
$R_1{}''$ is $-OR_4$ wherein $R_4$ is as defined above; hydroxymethyl; or $-NH-SO_2-R_3$ wherein $R_3$ is as defined above;
$R_5$ is benzyl, or as an alternative when $R_4$ is benzyl and $R_1{}''$ is benzyloxy, hydrogen;
B is
i.

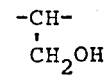

when $R_1{}''$ is hydroxy or benzyloxy;
ii.

when $R_1{}''$ hydroxymethyl; or
iii. $-CO-$ or

when $R_1{}''$ is $-NH-SO_2-R_3$ wherein $R_3$ is as defined above; and
$A''$ is
i. when $R_1{}''$ is hydroxyl or benzyloxy,

wherein the ring substituents are ortho or meta to each other; or

ii. when $R_1{}''$ is hydroxymethyl,

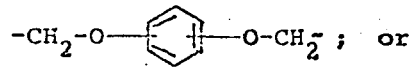 or iii. when $R_1{}''$ is $-NH-SO_2-R_3$ wherein $R_3$ is as defined above,

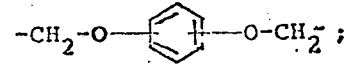

or $-(CH_2)_n-$ wherein $n$ is as defined above,
b. producing a compound of formula Ia,

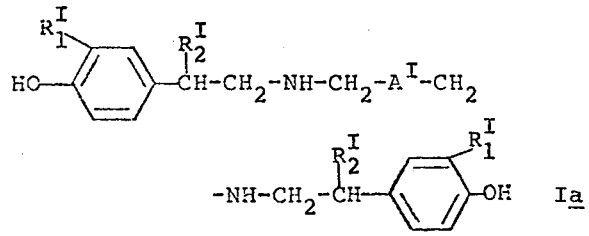 Ia wherein $R_1'$ is hydroxyl or $-NH-SO_2-R_3$,
wherein $R_3$ is as defined above;
$R_2'$ is
i. hydroxymethyl when $R_1'$ is hydroxy; or
ii. hydroxy when $R_1'$ is $-NH-SO_2-R_3$ wherein $R_3$ is as defined above; and
$A'$ is
i. when $R_1'$ is hydroxyl,

wherein the ring substituents are ortho or meta to each other; or
ii. when $R_1'$ is $-NH-SO_2-R_3$ wherein $R_3$ is as defined above,

 ;

or $-(CH_2)_n-$ wherein $n$ is as defined above,
by converting the ether groups into hydroxy groups in a compound of formula III,

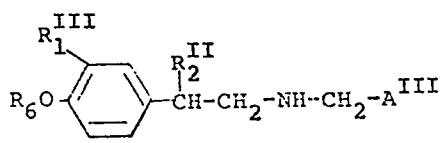

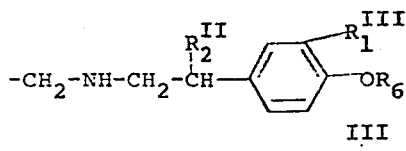

III wherein $R_6$ is methyl, ethyl or benzyl,
$R_1'''$ is $-OR_6$ wherein $R_6$ is as defined above or as an alternative when $R_6$ is methyl or ethyl, $-NH-SO_2-R_3$ wherein $R_3$ is as defined above,
$R_2''$ is
i. hydroxymethyl when $R_1'''$ is $-OR_6$ wherein $R_6$ is as defined above; or
ii. hydroxyl when $R_1'''$ is $-NH-SO_2-R_3$ wherein $R_3$ is as defined above; and
$A'''$ is
i. when $R_1'''$ is $-OR_6$ wherein $R_6$ is as defined above,

wherein the ring substituents are ortho or meta to each other; or
ii. when $R_1'''$ is $-NH-SO_2-R_3$ wherein $R_3$ is as defined above,

 ;

or $-(CH_2)_n-$ wherein $n$ is as defined above, or
c. producing the compound of formula Ib

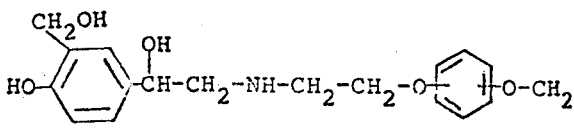

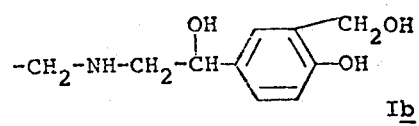

Ib by reducing a compound of formula IV,

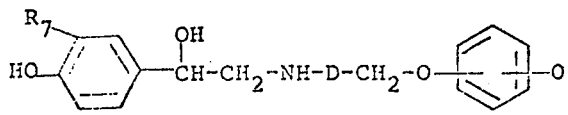

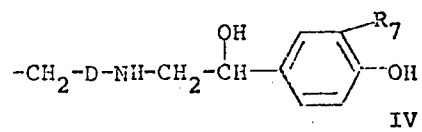

IV wherein $R_7$ is $-CH_2OH$ or $-COOR_8$ wherein $R_8$ is alkyl of 1 to 6 carbon atoms, and
D is $-CO-$ or as an alternative when $R_7$ is $-COOR_8$, $-CH_2-$.

When A in the compound of formula I is an alkylene chain, this preferably contains 2 to 6, especially 4 carbon atoms.

When $R_1$ is $-NH-SO_2-R_3$, the alkyl radical $R_3$ preferably signifies the methyl group.

Process variant (a) may, for example, be effected in the presence of a catalyst, preferably a palladium catalyst, in known manner, conveniently in an inert solvent, e.g. ethyl acetate or an alkanol such as methanol or ethanol. The reaction may conveniently be effected in the presence of acid, e.g. hydrochloric acid or acetic acid. The reaction may be preferably effected at a temperature of from 20° to 100°C and preferably at a hydrogen pressure of 1 to 200 atmospheres.

Process variant (b) of the invention may be effected in accordance with the usual methods for ether splitting. Thus, for example, a compound of formula III may be reacted preferably with a Lewis acid, e.g. boron tribromide or aluminium chloride, conveniently in an inert organic solvent, e.g. a halogenated hydrocarbon such as methylene chloride or carbon tetrachloride, or an aromatic hydrocarbon such as toluene or benzene. The reaction may be preferably effected at a temperature of from $-90°$ to $+70°C$, conveniently in the absence of air or moisture.

As an alternative a compound of formula III may be treated, preferably for a short time, with a, preferably strong, mineral acid, e.g. hydrobromic or hydriodic acid. The reaction may be preferably effected at an elevated temperature, e.g. from 20° to 100°C. As a further alternative a compound of formula III may be reacted with a hydrochloride, hydrobromide or hydriodide of an organic base such as aniline or pyridine, preferably at an elevated temperature.

Process variant (c) may, for example, be effected with metal or metalloid hydrides or complex metal or metalloid hydrides which are suitable for the reduction of esters or amides. Examples of suitable metal or metalloid hydrides for the reaction are aluminium hydrides and complex hydrides such as lithium aluminium hydride, aluminium hydride or di-isobutyl-aluminium hydride, trialkoxy-lithium aluminium hydrides, and sodium dihydro-bis(2-methoxyethoxy)aluminate, and boron hydrides such as diborane and lithium borohydride. The reduction may, for example, be effected in an inert solvent, e.g. an ether such as diethyl ether, tetrahydrofuran, dioxane or dimethoxyethane, and may be preferably effected at a temperature of from room temperature to 100°C.

The compounds of formula I may be isolated from the reaction mixture and purified in known manner. The free base forms of the compounds of formula I may be converted into acid addition salt forms in conventional manner and vice versa. Representative acids for acid addition salt formation are the organic acids, such as oxalic and fumaric acids, and the mineral acids, such as hydrochloric acid.

The starting materials may, for example, be obtained as follows:

a′. A compound of formula IIa,

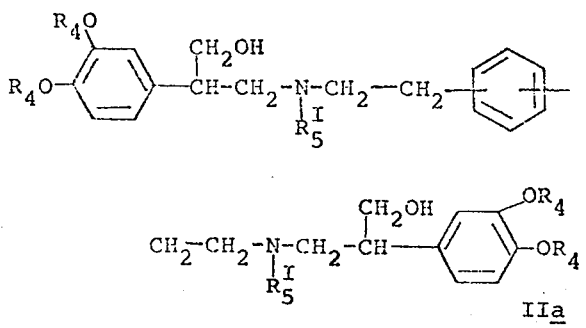

wherein $R_4$ is as defined above;

$R_5{}'$ is benzyl, or as an alternative when $R_4$ is benzyl, hydrogen; and with the proviso that the two substituents on the phenylene ring are ortho or meta to each other, and a compound of formula IIIa,

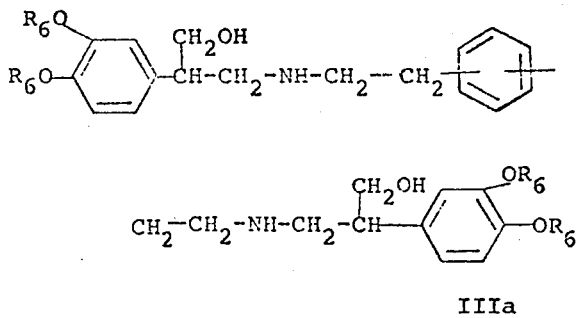

wherein $R_6$ is as defined above; and with the proviso that the substituents on the phenyl ring are ortho or meta to each other, may, for example, be obtained by reducing an analogous compound of formula V,

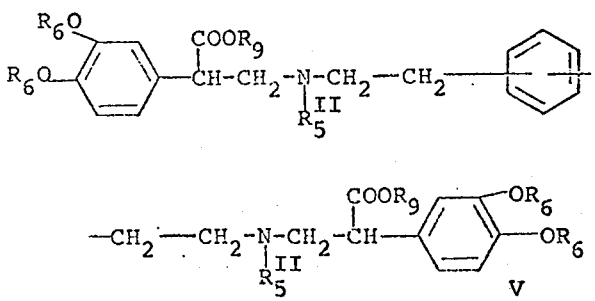

wherein $R_6$ is as defined above, $R_5{}''$ is hydrogen or benzyl, and $R_9$ is alkyl of 1 to 6 carbon atoms.

Any resulting compound of formula VI,

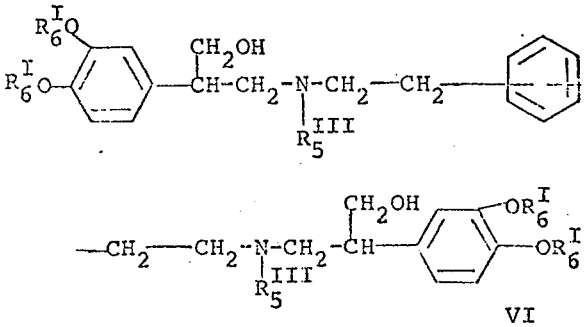

wherein $R_6{}'$ is methyl or ethyl, and $R_5{}'''$ is benzyl, may subsequently be converted into a compound of formula IIIa, e.g. by hydrogenolytic debenzylation in a manner analogous to that described for process variant (a), or into a compound of formula IIa by conversion of the ether groups into hydroxy groups, in a manner analogous to that described for process variant (b).

The ester group reduction of a compound of formula V may be effected in known manner preferably with metal hydrides or complex metal hydrides, e.g. with lithium aluminium hydride or aluminium hydride, conveniently in an inert solvent, e.g. an ether, preferably at a temperature of from room temperature to 100°C.

b′. A compound of formula V may, for example, be obtained by reacting a compound of formula VIII,

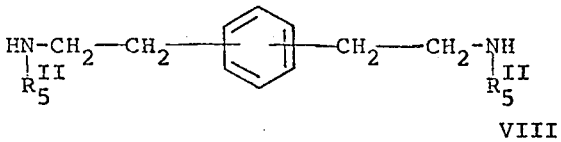

wherein $R_5{}''$ is as defined above, with a compound of formula VII,

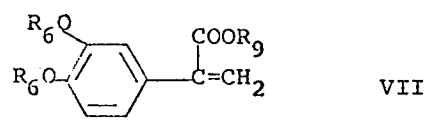

wherein $R_6$ and $R_9$ are as defined above. The reaction may, for example, be effected at a temperature preferably from 20° to 100°C. The reaction may be preferably effected in an inert solvent, e.g. an alcohol.

c′. A compound of formula IIb,

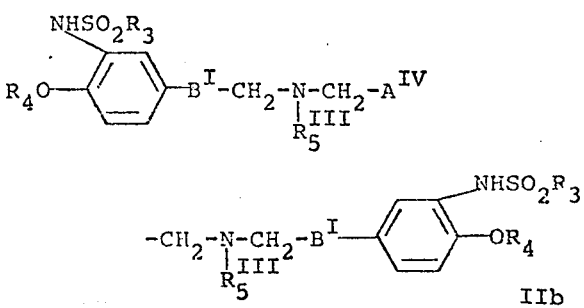

wherein $R_3$, $R_4$ and $R_5{}'''$ are as defined above, $A^{IV}$ is —$(CH_2)_n$—, wherein $n$ is as defined above,

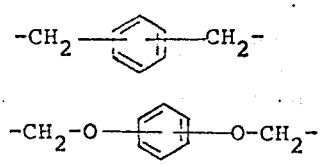 or

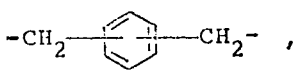

and B' is —CHOH— or —CO—,
and a compound of formula IIIb,

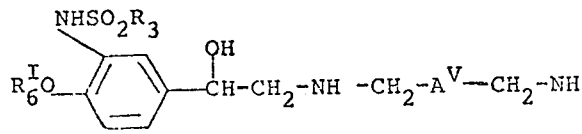

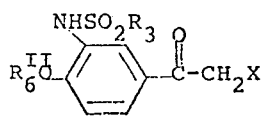

IIIb wherein $R_3$ and $R_6{}^I$ are as defined above, and $A^V$ is —$(CH_2)_n$—,
wherein $n$ is as defined above, or

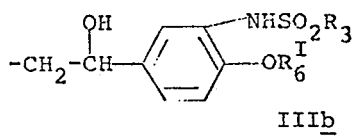

may, for example, be obtained by reacting a compound of formula IX,

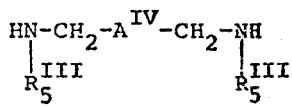  IX wherein
$R_3$ is as defined above,
$R_6{}^{II}$ is hydrogen, benzyl, methyl or ethyl, and
X is chlorine or bromine,
with a compound of formula X,

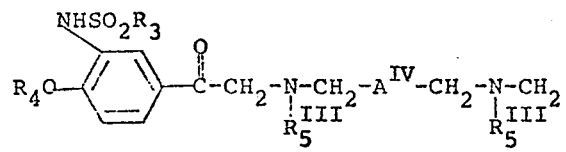  X wherein $R_5{}^{III}$ and $A^{IV}$ are as defined above,
and subsequently reducing any resulting compound of formula IIc,

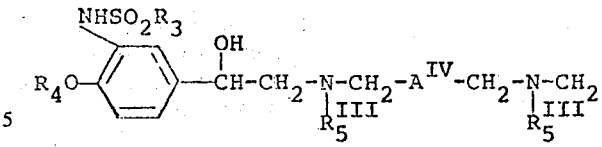

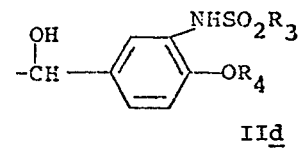

IId wherein $R_3$, $R_4$, $R_5{}^{III}$ and $A^{IV}$ are as defined above,
and hydrogenating any resulting compound of formula XI,

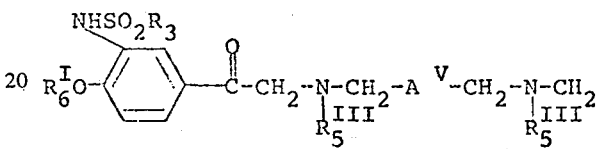

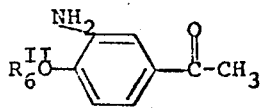

XI wherein $R_3$, $R_5{}^{III}$, $R_6{}^I$ and $A^V$ are as defined above,
to a compound of formula IIIb, e.g. in a manner analogous to that described for process variant (a).

The condensation reaction of a compound of formula IX with a compound of formula X may, for example, be effected in an inert solvent, e.g. an aromatic hydrocarbon or an aliphatic ketone, conveniently in the presence of a basic condensation agent, e.g. an alkali metal carbonate or an organic base, preferably at a temperature from 50° to 150°C. However, alternatively the reaction may be effected without solvent by heating the reaction mixture to a melt, preferably from 80 to 200°C.

d'. A compound of formula IX may, for example, be obtained by reacting a compound of formula XII,

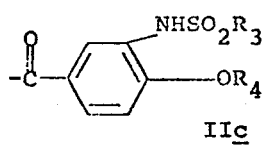  XII wherein $R_6{}^{II}$ is as defined above,
with a compound of formula XIII,

XIII wherein $R_3$ is as defined above, e.g. in the presence of an inert solvent.

The reaction may conveniently be effected in the presence of an acid-binding agent, e.g. a tertiary organic base, preferably triethylamine, conveniently at a temperature from 0° to 80°C, and subsequently brominating or chlorinating the resulting reaction product in known manner.

e'. A compound of formula XII may, for example, be

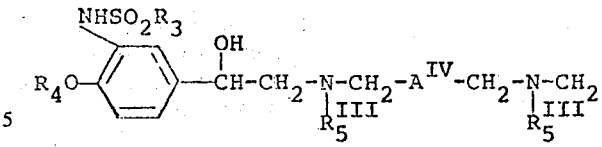

wherein $R_3$, $R_4$, $R_5{}^{III}$ and $A^{IV}$ are as defined above,
preferably with sodium borohydride to a compound of formula IId, obtained by alkylating 4-hydroxy-3-nitroacetophenone to form an ether and subsequently reducing the nitro group to the amino group. The reduction may, for example, be effected in preferably alcoholic solution with hydrazine sulfate preferably in the presence of Raney nickel, or hydrogenolytically.

f'. A compound of formula IIe,

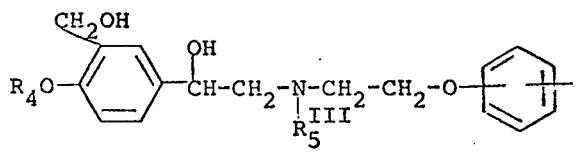
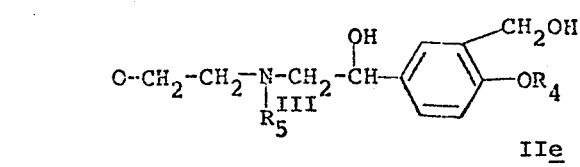

IIe wherein $R_4$ and $R_5'''$ are as defined above,
may, for example, be obtained by reacting a compound of formula XIV,

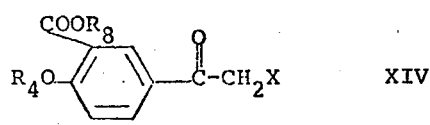

XIV wherein $R_4$, $R_8$ and X are as defined above,
with a compound of formula XV,

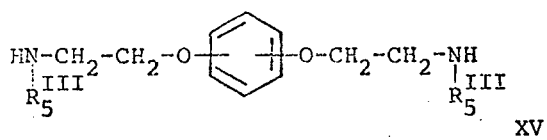

XV wherein $R_5'''$ is as defined above, e.g. in a manner analogous to that described for the condensation reaction of process (c'), and reducing the resulting compound of formula XVI,

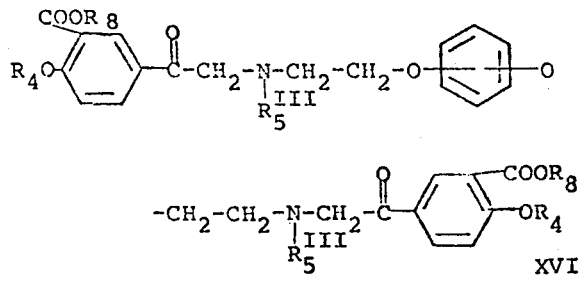

XVI wherein $R_4$, $R_5'''$ and $R_8$ are as defined above, e.g. with a metalloid or metal hydride or a complex metal or metalloid hydride, in a manner analogous to that described for process variant (c).

g'. A compound of formula IVa,

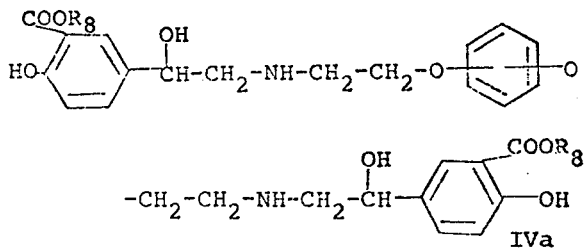

IVa wherein $R_8$ is as defined above,
may, for example, be obtained by hydrogenating a compound of formula XVI, e.g. in a manner analogous to that described for process variant (a).

h'. A compound of formula IVb,

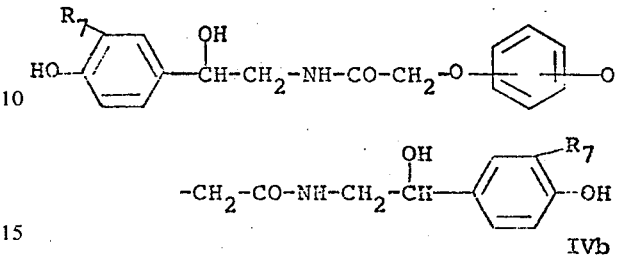

IVb wherein $R_7$ is as defined above,
may, for example, be obtained by reacting a compound of formula XVII,

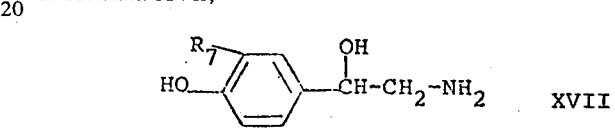  XVII wherein $R_7$ is as defined above,
with a compound of formula XVIII.

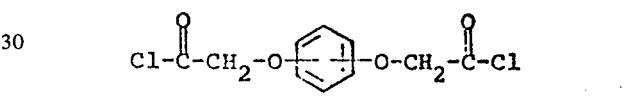

XVIII

The condensation reaction may be effected in accordance with the usual methods for the production of acid amides. For example, the reaction may be effected in the presence of an inert organic solvent, e.g. a chlorinated hydrocarbon such as chloroform or methylene chloride, an aliphatic ketone, or dimethyl formamide, preferably in the presence of a basic condensation agent, e.g. an alkali metal carbonate such as sodium or potassium carbonate, or an organic base such as triethylamine, conveniently at a temperature from 0° to 50°C.

i'. A compound of formula XV may, for example, be obtained by condensing the corresponding diphenol with chloroacetonitrile, reducing the resulting dinitrile to a diamine with a complex metal or metalloid hydride, e.g. lithium aluminium hydride, and subsequently benzylating, preferably by reductive reaction of the resulting compound with benzaldehyde, e.g. in the presence of sodium borohydride, or by hydrogen catalytically activated by, for example, nickel.

j'. A compound of formula IIf,

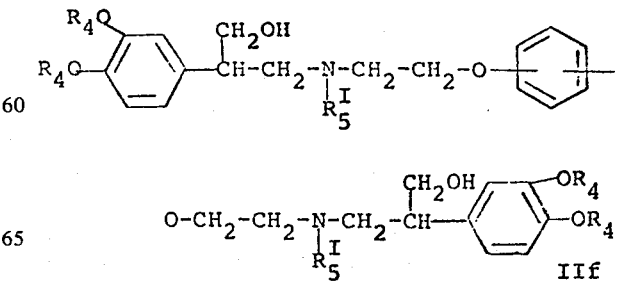

IIf wherein $R_4$ and $R_5'$ are as defined above,
may, for example, be obtained by reacting a compound of formula XIX,

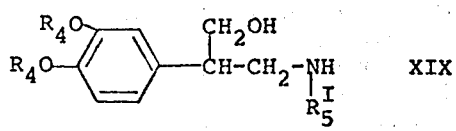

wherein $R_4$ and $R_5{}'$ are as defined above,
with a compound of formula XVIII, e.g. in a manner analogous to that described for the condensation reaction of process variant (c') or (h').

k'. A compound of formula IIf may, for example, likewise be obtained by reducing a compound of formula XX,

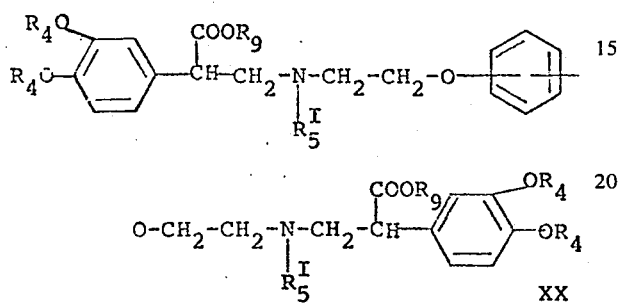

wherein $R_4$, $R_5{}'$ and $R_9$ are as defined above,
e.g. in a manner analogous to that described for the ester group reduction reaction of process variant (a').

l'. A compound of formula XX may, for example, be obtained by reacting ammonia or benzylamine with a compound of formula VII, e.g. in a manner analogous to that described for process variant (b'), converting any methoxy or ethoxy groups into hydroxy groups in a manner analogous to that described for process variant (b), and subsequently reacting the resulting reaction product with a compound of formula XVIII, e.g. in a manner analogous to that described for the condensation reaction of process variant (c') or (h').

A compound of formula XX wherein $R_4$ is benzyl may, for example, likewise be obtained by reacting a compound of formula VII wherein $R_6$ is benzyl, with a compound of formula XXI,

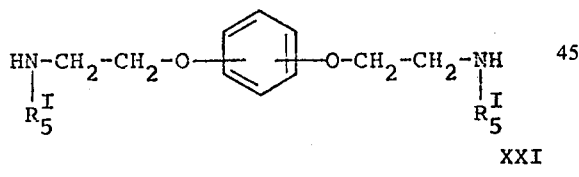

wherein $R_5{}'$ is as defined above,
e.g. in a manner analogous to that described for process variant (b').

Insofar as the production of the starting materials is not particularly described, these compounds are known or may be produced and purified in accordance with known processes, or in a manner analogous to known processes or to processes described herein.

The compounds of formula I have not been described in the literature. The compounds of formula I are useful because they possess pharmacological activity in animals. In particular, the compounds are useful as bronchospasmolytic agents for the treatment of obstructive respiratory tract diseases, e.g. asthma bronchiale, as indicated by an inhibition of the bronchospasm induced by histamine in cats on i.v. administration of 0.001 to 0.1 mg/kg animal body weight, of the compound.

For the above-mentioned use the dosage will, of course, vary depending on the compound employed, mode of administration and therapy desired. However, in general, satisfactory results are obtained when administered at a daily dosage of from about 0.001 mg to about 0.15 mg per kg animal body weight, preferably given in divided doses 2 to 4 times a day or in sustained release form. For the larger mammals, the total daily dosage is in the range from about 0.05 to about 10 mg, and the peroral daily dose is from about 2 to about 10 mg. Unit dosage forms suitable for oral administration comprise from about 0.5 mg to about 5 mg of the compounds admixed with a solid or liquid pharmaceutical carrier or diluent.

Specific examples of daily dosages, at which satisfactory results are obtained, are:

i. N,N'-bis[2-(4-hydroxy-3-methylsulfonamidophenyl)-2-hydroxyethyl]-2,2'-(o-phenylenedioxy) bis(ethylamine), from 0.001 to 0.15 mg/kg animal body weight, administered i.v. for animals in general, e.g. a cat, and for the larger mammals from 2 to 10 mg. administered p.o.;

ii. N,N'-bis[2-hydroxy-2-(4-hydroxy-3-hydroxymethylphenyl)ethyl]-2,2'-(o-phenylenedioxy)bis(ethylamine), from 0.001 to 0.01 mg/kg animal body weight, administered i.v., and from 0.05 to 0.15 mg/kg animal body weight, administered i.d., for animals in general, e.g. a cat, and for the larger mammals from 2 to 10 mg, administered p.o.;

iii. bis-{N-[2-(4-hydroxy-3-methylsulfonamidophenyl)-2-hydroxyethyl]-2-amino-1-ethyl }-p-phenylene, from 0.1 to 0.15 mg/kg animal body weight, administered i.v., for animals in general, e.g. a cat, and for the larger mammals from 2 to 10 mg, administered p.o.;

iv. N,N'-bis[2-(4-hydroxy-3-methylsulfonamidophenyl)-2-hydroxyethyl]hexamethylene diamine, from 0.001 to 0.1 mg/kg animal body weight, administered i.v., for animals in general, e.g. a cat, and for the larger mammals from 2 to 10 mg, administered p.o.;

v. 3,3'-[2,2'-(o-phenylene)bis(ethylamino-)]bis[2-(3,4-dihydroxyphenyl)-1-propanol], from 0.001 to 0.1 mg/kg animal body weight, administered i.v., and from 0.05 to 0.15 mg/kg animal body weight, administered i.d., for animals in general, e.g. a cat, and for the larger mammals from 2 to 10 mg, administered p.o.; and vi. 3,3'-[2,2'-(o-phenylenedioxy)bis(ethylamino)]bis [2-(3,4-dihydroxyphenyl)-1-propanol], from 0.001 to 0.15 mg/kg animal body weight, administered i.v., for animals in general, e.g. a cat, and for the larger mammals from 2 to 10 mg, administered p.o.

N,N'-Bis[2-hydroxy-2-(4-hydroxy-3-hydroxymethylphenyl)ethyl]-2,2'-(o-phenylenedioxy)bis (ethylamine) and N,N'-bis[2-(4-hydroxy-3-methylsulfonamidophenyl)-2-hydroxyethyl]-2,2'-(o-phenylenedioxy)bis(ethylamine have particularly interesting properties:

The compounds of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate and tartrate and mineral acid salt forms such as the hydrochloride, hydrobromide and sulphate. A pharmaceutical composition may comprise a compound of formula I, in free base form or in pharmaceutically acceptable acid addition salt form, in association with a pharmaceutical carrier or diluent. Such compositions may be prepared by conventional techniques to be in the form of, for example, capsules, tablets, suppositories, suspensions or solutions, for enteral or parenteral administration. Aside from the usual pharmaceutical diluents or carriers, e.g. water, alcohols, natural or hardened oils and waxes, these pharmaceutical compositions may contain suitable preserving, stabilizing, wetting, solubilizing, sweetening, flavouring or colouring agents.

A preferred form of composition is a liquid for spraying, containing 1 % (w/w) of the compound.

An interesting group of compounds comprises compounds of formula I wherein A is

In a preferred sub-group $R_1$ is —NH—SO$_2$—R$_3$ wherein $R_3$ is as defined above. In another preferred sub-group $R_1$ is hydroxymethyl.

Another interesting group of compounds comprises compounds of formula I wherein A is

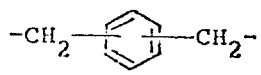

or —(CH$_2$)$_n$— wherein $n$ is 0 or an integer from 1 to 8 and $R_1$ is —NH—SO$_2$—R$_3$ wherein $R_3$ is as defined above.

Another interesting group of compounds comprises compounds of formula I wherein A is ortho or meta

and preferably $R_1$ is hydroxyl.

In the following Examples all temperatures are indicated in degrees Centigrade.

Palladium/charcoal in the Examples refers to 10 % (w/w) palladium on charcoal except where otherwise stated.

EXAMPLE 1:
3,3'-[2,2'-(o-phenylene)bis(ethylamino)]bis[2-(3,4-dihydroxyphenyl)-1-propanol][process variant a]

3.5 g of 3,3'-[2,2'-(o-phenylene)bis(ethylamino)]bis[2-(3,4-dibenzyloxyphenyl)-1-propanol]-bis-hydrogen oxalate are dissolved in 75 cc of methanol and after the addition of 0.2 g of palladium/charcoal, hydrogenation is effected at 40° and a hydrogen pressure of 6 atmospheres. After 4 hours, the catalyst is filtered off and the filtrate is concentrated by evaporation; the residue is recrystallized from ethanol/ether, the title compound is obtained as the oxalate monohydrate salt form. M.P. 118°–120°.

The starting material is obtained as follows:
a. 65.2 g of α-(3,4-dibenzyloxyphenyl)acrylic acid ethyl ester and 12.2 g of o-bis(2-aminoethyl) benzene (produced by reaction of α-(α,α'-dibromo) xylene and sodium cyanide and subsequent reduction of the dinitrile with aluminium hydride) are heated at reflux in 30 cc of ethanol for 4 hours. The solvent is removed by distillation in a vacuum, whereby 3,3'-[2,2'-(o-phenylene(bis(e-thylamino-
)]bis[2-(3,4-dibenzyloxyphenyl)propionic acid ethyl ester] is obtained as residue in the form of a thick oil which is sufficiently pure for the next reaction.

b. 25.0 g of the product described above are reduced in 300 cc of tetrahydrofuran with 4.2 g of lithium aluminium hydride by heating at reflux for 3 hours. The reaction mixture is then decomposed with a small amount of water while cooling, filtration is effected, the tetrahydrofuran solution is dried over sodium sulphate and the solvent is removed by distillation. The resulting 3,3'-[2,2'-(o-phenylene)bis(ethylamino)]bis[2-(3,4-dibenzyloxyphenyl)-1-propanol] crystallizes from ethanol/ether as bis-hydrogen oxalate, after the addition of oxalic acid. M.P. 141° to 144°.

EXAMPLE 2:
3,3'-[2,2'-(m-phenylene)bis(ethylamino)]bis [2-(3,4-dihydroxyphenyl)-1-propanol][process variant a]

3,3'-[2,2'-(m-phenylene)bis(ethylamino)]bis-[2-(3,4-dibenzyloxyphenyl)-1-propanol] is reacted as described in Example 1. The fumarate salt form of the title compound has a M.P. of 80°–85° (from ethanol/ether).

The starting material may be produced in a manner analogous to that described in Example 1a and 1b:
a. 3,3'-[2,2'-(m-phenylene)bis(ethylamino)]bis[2-(3,4-dibenzyloxyphenyl)propionic acid ethyl ester] M.P. of the dihydrochloride: 129° to 132° (ethanol/ether).
b. 3,3'-[2,2'-(m-phenylene(bis(ethylamino)]bis[2-(3,4-dibenzyloxyphenyl)-1-propanol] M.P. of the dihydrochloride: 88° to 91° (ethanol/ether).

EXAMPLE 3:
N,N'-bis[2-(4-hydroxy-3-methylsulphonamidophenyl)-2-hydroxyethyl]hexamethylene diamine [process variant a]

11.5 g of N,N'-dibenzyl-N,N'-bis(4-benzyloxy-3-methanesulphonamidophenacyl)hexamethylene diamine are dissolved in 100 cc of 95 % ethanol, 13.4 cc of a 2 N solution of hydrochloric acid in ethanol are added and hydrogenation is effected at 50° and a hydrogen pressure of 6 atmospheres for 4 hours after the addition of 2.5 g of palladium/charcoal (10 %). Dilution with 15 cc of water is effected, the catalyst is filtered off, the solution is concentrated and the dihydrochloride salt form of the title compound which crystallizes is filtered off. After crystallization from methanol/ethanol the dihydrochloride salt form of the title compound has a M.P. over 180° (decomp.).

The starting material may be obtained as follows:
a. 10.0 g of 2-benzyloxy-5-(2-bromoacetyl)methanesulphanilide, 7.0 g of N,N'-dibenzylhexamethylene diamine and 100 cc of ethylmethyl ketone are mixed and stirring is effected at the boil for 4 hours. The reaction mixture is allowed to cool to room temperature, the precipitated N,N'-dibenzylhexamethylene diamine dihydrochloride is filtered off and the filtrate is evaporated to dryness. The resulting N,N'-dibenzyl-N,N'-bis(4-benzyloxy-3-methanesulphonamidophenacyl) hexamethylene diamine is used for the next reaction without purification.

EXAMPLE 4:
Bis-{N-[2-(4-hydroxy-3-methylsulphonamidophenyl)-2-hydroxyethyl]-2-amino-1-ethyl}-p-phenylene [process variant a]

Bis-[N-benzyl-N-(4-benzyloxy-3-methylsulphonamidophenacyl)-2-amino-1-ethyl]-p-phenylene is reacted as described in Example 3. The dihydrochloride salt form of the title compound has a M.P. from 225° (decomp., from methanol/ethanol).

The bis-[N-benzyl-N-(4-benzyloxy-3-methylsulphonamidophenacyl)-2-amino-1-ethyl]-p-phenylene, required as starting material, may be obtained from 10.0 g of 2-benzyloxy-5-(2-bromoacetyl)-methanesulphoanilide and 8.3 g of N,N'-dibenzyl-1,4-bis(2-aminoethyl)benzene in 130 cc of ethylmethyl ketone, in a manner analogous to that described in Example 3a, and is used for the next reaction without purification.

EXAMPLE 5:
N,N'-bis[2-hydroxy-2-(4-hydroxy-3-hydroxymethylphenyl)ethyl]-2,2'-(o-phenylenedioxy)bis(ethylamine) [process variant a]

10.0 g of N,N'-dibenzyl-N,N'-bis[2-hydroxy-2-(4-hydroxy-3-hydroxymethylphenyl)ethyl]-2,2'-(o-phenylenedioxy)bis(ethylamine) are hydrogenated in 200 cc of ethanol with palladium/charcoal at 50° and a hydrogen pressure of 5 atmospheres for 4 hours. The catalyst is filtered off, the filtrate is concentrated and the product is crystallized as oxalate salt form from ethanol/ether. M.P.: decomposition over 250°.

The starting material is produced as follows:
a. 57.2 g of 3-carbethoxy-4-hydroxyphenacyl bromide and 75.2 g of N,N'-dibenzyl-(o-phenylenedioxy)bis(ethylamine) are heated at reflux for 5 hours in 500 cc of methylethyl ketone. The reaction mixture is cooled to 10°, filtration is effected and the filtrate is concentrated by evaporation. The N,N'-dibenzyl-N,N'-bis(3-carbethoxy-4-hydroxyphenacyl)-2,2'-(o-phenylenedioxy)bis-(ethylamine), obtained as oily residue, is converted into the dihydrochloride with hydrochloric acid in ethanol, M.P. 115°–117° (ethanol/ether).

b. 49 g of the product described above in the form of the free base are reduced with 12.5 g of lithium aluminium hydride in 2.5 litres of tetrahydrofuran by heating at reflux for 2 hours. The reaction mixture is decomposed with a small amount of water while cooling, filtration is effected and the filter residue is then dissolved in 2 N hydrochloric acid. The pH is adjusted to 7–8 by the addition of sodium hydrogen carbonate and the mash is then exhaustively extracted with isobutanol. The extract is dried over sodium sulphate and concentrated by evaporation. The resulting N,N'-dibenzyl-N,N'-bis[2-hydroxy-2-(4-hydroxy-3-hydroxymethylphenyl)ethyl]-2,2'-(o-phenylenedioxy) bis(ethylamine crystallizes from ethyl acetate/petroleum ether, M.P. 115°–117°.

EXAMPLE 6:
N,N'-bis[2-hydroxy-2-(4-hydroxy-3-hydroxymethylphenyl)ethyl]-2,2'-(m-phenylenedioxy)bis (ethylamine) [process variant a]

N,N'-dibenzyl-N,N'-bis[2-hydroxy-2-(4-hydroxy-3-hydroxymethylphenyl)ethyl]-2,2'-(m-phenylenedioxy)bis(ethylamine is reacted as described in Example 5 and the resulting title compound is converted into its dihydrochloride salt form, which has a M.P. over 250° (decomp.) after crystallization from ethanol/ether.

The starting material is produced in a manner analogous to that described in Example 5a and 5b:
a. N,N'-dibenzyl-N,N'-bis(3-carbethoxy-4-hydroxyphenacyl)-2,2'-(m-phenylenedioxy)bis(ethylamine)
Viscous oil, used for the next reaction without purification.

b. N,N'-dibenzyl-N,N'-bis[2-hydroxy-2-(4-hydroxy-3-hydroxymethylphenyl)ethyl]-2,2'-(m-phenylenedioxy)bis(ethylamine)
Viscous, light yellow oil; used for the next reaction without purification.

EXAMPLE 7:
3,3'-[2,2'-(o-phenylenedioxy)bis(ethylamino)] bis[2-(3,4-dihydroxyphenyl)-1-propanol] [process variant a]

4.0 g of 3,3'-[2,2'-(o-phenylenedioxy)bis(ethylamino)]bis[2-(3,4-dibenzyloxyphenyl)-1-propanol]dihydrochloride are hydrogenated in 100 cc of methanol with palladium/charcoal at 50° and a hydrogen pressure of 5 atmospheres for 18 hours. The catalyst is subsequently filtered off, the filtrate is concentrated by evaporation and the resulting dihydrochloride salt form of the title compound is recrystallized from ethanol/ether. M.P. 91°–94°.

The starting material may be produced in a manner analogous to that described in Example 1 a and 1 b:
a. 3,3'-[2,2'-(o-phenylenedioxy)bis(ethylamino)]-bis[ 2-(3,4-dibenzyloxyphenyl)propionic acid ethyl ester], produced from α-(3,4-dibenzyloxyphenyl)acrylic acid ethyl ester and o-bis-(2-aminoethoxy)benzene. M.P. of the dihydrochloride: 126° to 127° (ethanol/ether).

b. 3,3'-[2,2'-(o-phenylenedioxy)bis(ethylamino)]bis[2-(3,4-dibenzyloxyphenyl)-1-propanol]. M.P. of the dihydrochloride: 132° to 136° (ethanol/ether).

EXAMPLE 8:
N,N'-bis[2-(4-hydroxy-3-methylsulphonamidophenyl)-2-hydroxyethyl]-2,2'-(o-phenylenedioxy)bis(ethylamine) [process variant a]

13.2 g of N,N'-dibenzyl-N,N'-bis(4-benzyloxy-3-methylsulphonamidophenacyl)-2,2'-(o-phenylenedioxy)bis(ethylamine) are hydrogenated in 125 cc of 95 % ethanol, 125 cc of methanol and 20 cc of glacial acetic acid at 50° and 6 atmospheres for 10 hours. The catalyst is subsequently filtered off, the filtrate is concentrated and the title compound is recrystallized thrice from ethanol/ether. M.P.: 80° to 82° (with decomp.).

The N,N'-dibenzyl-N,N'-bis(4-benzyloxy-3-methylsulphonamidophenacyl)-2,2'-(o-phenylenedioxy)-bis(ethylamine, required as starting material, may be obtained in a manner analogous to that described in Example 3 a, from 10.0 g of 2-benzyloxy-5-(2-bromoacetyl)methanesulphonalide and 9.5 g of N,N'-dibenzyl-(o-phenylenedioxy)bis(ethylamine) in 150 cc of ethylmethyl ketone. The oily crude product is used as such for the next reaction.

EXAMPLE 9:
3,3'-[2,2'-(o-phenylene)bis(ethylamino)]bis-[2-(3,4-dihydroxyphenyl)-1-propanol] [process variant b]

8.5 g of 3,3'-[2,2'-(o-phenylene)bis(ethylamino)]bis[2-(3,4-dibenzyloxyphenyl)-1-propanol] are dissolved in 250 cc of methylene chloride, and 25.0 g of boron tribromide in the form of a 1 molar solution in methylene chloride are added dropwise at −70° to −75° while stirring. The reaction mixture is allowed to warm to room temperature and the solvent is then removed by distillation in vacuum. The residue is heated at reflux for one hour with 100 cc of ethanol. After concentrating by evaporation, the resulting oil is converted into the oxalate monohydrate salt form of the title compound with 2 N oxalic acid in methanol. M.P. 118°–120°.

EXAMPLE 10:
3,3'-[2,2'-(m-phenylene)bis(ethylamino)]bis[2-(3,4-dihydroxyphenyl)-1-propanol] [process variant b]

3,3'-[2,2'-(m-phenylene)bis(ethylanino)]bis[2-(3,4-dibenzyloxyphenyl)-1-propanol] is reacted as described in Example 9. M.P. of the fumarate salt form of the title compound: 80°–85° (from ethanol/ether).

EXAMPLE 11:
N,N'-bis[2-(4-hydroxy-3-methylsulphonamidophenyl)-2-hydroxyethyl]hexamethylene diamine [process variant b]

A solution of 5 cc of boron tribromide in 50 cc of absolute methylene chloride is added dropwise with stirring to a solution cooled to −80° of 2.5 g of N,N'-bis[2-(4-methoxy-3-methylsulphonamidophenyl)-2-hydroxyethyl]hexamethylene diamine in 125 cc of absolute methylene chloride in an atmosphere of nitrogen and the mixture is subsequently stirred at this temperature for one hour and at room temperature for 2 hours. After removing the solvent by distillation, boiling at reflux with 250 cc of ethanol is effected for 30 minutes. After evaporating the solvent, the resulting dihydrobromide of the title compound is suspended in 30 cc of water, 100 cc of isobutanol are added and the reaction mixture is rendered alkaline with sodium carbonate. After separation, the organic solution is washed with water, dried over magnesium sulphate, concentrated by evaporation, and the title compound, obtained as residue, is converted into its dihydrochloride salt form. M.P.: over 180° (decomp., from methanol/ethanol).

The starting material may be produced as follows:
a. 8.1 g of 5-(2-bromoacetyl)-2-methoxymethanesulphanilide, 7.0 g of N,N'-dibenzylhexamethylene diamine and 100 cc of ethylmethyl ketone are reacted in a manner analogous to that described in Example 3 a to produce N,N'-dibenzyl-N,N'-bis(4-methoxy-3-methanesulphonamidophenacyl)hexamethylene diamine and this is used for the next reaction without purification.
b. N,N'-dibenzyl-N,N'-bis(4-methoxy-3-methanesulphonamidophenacyl)hexamethylene diamine is hydrogenated as described in Example 1 and the resulting crude product is divided between 50 cc of a 2 N caustic soda solution and 100 cc of an isobutanol/toluene mixture (1:1). The N,N'-bis[2-(4-methoxy-3-methylsulphonamidophenyl)-2-hydroxyethyl]hexamethylene diamine, obtained after concentrating the organic phase which has been washed with a saturated common salt solution, is used for the next reaction without purification.

EXAMPLE 12:
N,N'-bis[2-hydroxy-2-(4-hydroxy-3-hydroxymethylphenyl) ethyl[-2,2'-(o-phenylenedioxy) bis(ethylamine) [process variant c]

37 g of crude oily N,N'-bis[2-(3-carbethoxy-4-hydroxyphenyl)-2-hydroxyethyl]-2,2'-(o-phenylenedioxy)bis(ethylamine) are dissolved in 2.5 litres of tetrahydrofuran and reduction is effected with 12.0 g of lithium aluminium hydride by heating at reflux for 2 hours. Decomposition is then effected with a small amount of water while cooling and filtration is effected. The filter residue is dissolved in 2 N hydrochloric acid and the pH of the solution is adjusted to 7 to 8 by the addition of potassium hydrogen carbonate. The mash is then exhaustively extracted with isobutanol. The extract is dried with sodium sulphate and concentrated by evaporation. The resulting title compound is converted into its oxalate salt form, which has a M.P. over 250° (decomp.) after recrystallization from ethanol/ether.

The starting material may be obtained as follows:
50 g of N,N'-dibenzyl-N,N'-bis(3-carbethoxy-4-hydroxyphenacyl)-2,2'-(o-phenylenedioxy)bis(ethylamine) are hydrogenated in 1000 cc of ethanol with palladium/charcoal at 50° and a hydrogen pressure of 5 atmospheres for 4 hours. The catalyst is subsequently filtered off and the filtrate is concentrated by evaporation. N,N'-bis[2-(3-carbethoxy-4-hydroxyphenyl)-2-hydroxyethyl]-2,2'-(o-phenylenedioxy)bis(ethylamine) is obtained as an oil which is used for the next reaction without further purification.

EXAMPLE 13:
N,N'-bis[2-hydroxy-2-(4-hydroxy-3-hydroxymethylphenyl)-ethyl]-2,2'-(o-phenylenedioxy)bis(ethylamine)[ process variant c]

10.0 g of N,N'-bis[2-hydroxy-2-(4-hydroxy-3-hydroxymethylphenyl)-ethyl]-(o-phenylenedioxy)bis-(acetamide) are reduced in 300 cc of tetrahydrofuran with 3.0 g of lithium aluminium hydride by heating at reflux for 5 hours and the reaction mixture is worked up as described in Example 12. The oxalate salt form of the title compound has a M.P. over 250° (decomp., ethanol/ether).

The starting material is produced as follows:
a. A solution of 4.6 g of o-phenylenedioxy-bis(acetyl chloride) is added dropwise while stirring to a solution of 14.4 g of 2-(4-hydroxy-3-hydroxymethylphenyl)-2-hydroxyethylamine in 200 cc of methylethyl ketone, whereby the temperature is kept between 10° and 30°. After the addition is complete, stirring is continued at 50° for 1 hour, cooling to 10° and filtration are effected. The filtrate is concentrated by evaporation and the resulting N,N'-bis[2-hydroxy-2-(4-hydroxy-3-hydroxymethylphenyl)ethyl]-(o-phenylenedioxy)-bis(acetamide) is used for the next reaction without purification.

What is claimed is:
1. A compound of the formula:

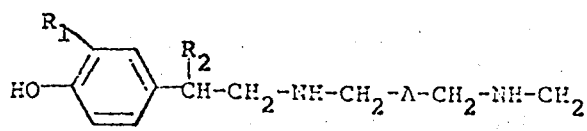

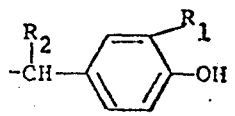

wherein
- R₁ is hydroxyl or hydroxymethyl
- R₂ is hydroxymethyl when R₁ is hydroxyl; or hydroxyl when R₁ is other than hydroxyl; and
- A is
  i. when R₁ is hydroxyl,

wherein the ring substituents are ortho or meta to each other; or

ii. when R₁ is hydroxymethyl,

or a pharmaceutically acceptable acid addition salt thereof.

2. A compound of claim 1, wherein R₁ is hydroxymethyl, R₂ is hydroxyl, and A is

3. The compound of claim 2, which is N,N'-bis[2-hydroxy-2-(4-hydroxy-3-hydroxymethylphenyl)ethyl]-2,2'-(o-phenylenedioxy)bis(ethylamine).

4. The compound of claim 2, which is N,N'-bis[2-hydroxy-2-(4-hydroxy-3-hydroxymethylphenyl)ethyl]-2,2'-(m-phenylenedioxy)bis(ethylamine).

5. The compound of claim 1, which is 3,3'-[2,2'-(o-phenylene)bis(ethylamino)]bis[2-(3,4-dihydroxyphenyl)-1-propanol].

6. The compound of claim 1, which is 3,3'-[2,2'-(m-phenylene)bis(ethylamino)]bis[2-(3,4-dihydroxyphenyl)-1-propanol].

7. The compound of claim 1, which is 3,3'-[2,2'-(o-phenylenedioxy)bis(ethylamino)]bis[2-(3,4-dihydroxyphenyl)-1-propanol].

* * * * *